US007750504B2

(12) United States Patent
Lee (10) Patent No.: US 7,750,504 B2
(45) Date of Patent: Jul. 6, 2010

(54) POWER SUPPLY APPARATUS TO SELECTIVELY OUTPUT ONE OF A PLURALITY OF INPUT POWERS

(75) Inventor: Hyun-jun Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/751,832

(22) Filed: May 22, 2007

(65) Prior Publication Data

US 2008/0054725 A1 Mar. 6, 2008

(30) Foreign Application Priority Data

Sep. 4, 2006 (KR) ............... 10-2006-0084872

(51) Int. Cl.
*H02J 1/00* (2006.01)
(52) U.S. Cl. .................................. 307/80; 307/43
(58) Field of Classification Search .............. 307/43, 307/64, 80, 85, 86
See application file for complete search history.

(56) References Cited

U.S. PATENT DOCUMENTS

| | | | | | |
|---|---|---|---|---|---|
| 4,617,473 | A | * | 10/1986 | Bingham | 307/66 |
| 4,754,160 | A | * | 6/1988 | Ely | 307/64 |
| 4,812,672 | A | * | 3/1989 | Cowan et al. | 307/64 |
| 5,598,041 | A | * | 1/1997 | Willis | 307/43 |
| 5,608,273 | A | * | 3/1997 | Bartlett | 307/64 |
| 5,640,076 | A | * | 6/1997 | Youn | 320/138 |
| 5,703,415 | A | * | 12/1997 | Tanaka | 307/66 |
| 5,811,895 | A | * | 9/1998 | Suzuki et al. | 307/125 |
| 5,886,561 | A | * | 3/1999 | Eitan et al. | 327/408 |
| 5,939,799 | A | * | 8/1999 | Weinstein | 307/64 |
| 5,945,816 | A | * | 8/1999 | Marusik | 323/273 |
| 6,075,345 | A | * | 6/2000 | Lee | 320/138 |
| 6,285,091 | B1 | * | 9/2001 | Chan et al. | 307/64 |
| 6,522,190 | B1 | * | 2/2003 | Malik et al. | 327/408 |
| 6,566,766 | B2 | * | 5/2003 | Matsuda et al. | 307/82 |
| 6,995,599 | B2 | * | 2/2006 | Huang et al. | 327/408 |

(Continued)

FOREIGN PATENT DOCUMENTS

CN 1282010 1/2001

(Continued)

OTHER PUBLICATIONS

Office Action issued by State Intellectual Property Office of People's Republic of China on May 15, 2009, in Chinese Application No. 2007101491246 (22 pages, in Chinese with complete English translation).

*Primary Examiner*—Stephen W Jackson
*Assistant Examiner*—Adi Amrany
(74) *Attorney, Agent, or Firm*—Staas & Halsey LLP (57) ABSTRACT

A power supplying apparatus supplying power to a predetermined system unit is provided with a power selecting unit which is directly connected to the system part, to select one of a plurality of inputs of power and output a selected power to the system unit; and a controller which is provided outside a power supplying path between the power selecting unit and the system unit, to control the power selecting unit to selectively output the power selected by the power selecting unit to the system unit according to a power switching signal.

20 Claims, 3 Drawing Sheets

U.S. PATENT DOCUMENTS

| | | |
|---|---|---|
| 7,038,522 B2 * | 5/2006 | Fauh et al. .................. 327/407 |
| 7,148,587 B2 * | 12/2006 | Matsuda et al. ............... 307/80 |
| 7,332,833 B2 * | 2/2008 | Pan et al. ..................... 307/65 |
| 2002/0113494 A1 * | 8/2002 | Winick et al. ................. 307/85 |
| 2003/0090158 A1 | 5/2003 | Fauh et al. |
| 2004/0051384 A1 * | 3/2004 | Jackson et al. ................ 307/43 |
| 2004/0217653 A1 * | 11/2004 | Neidorff ...................... 307/80 |

FOREIGN PATENT DOCUMENTS

| | | |
|---|---|---|
| JP | 3-243119 | 10/1991 |
| JP | 6-86458 | 3/1994 |
| JP | 2002-112469 | 4/2002 |

\* cited by examiner

POWER SUPPLY APPARATUS TO SELECTIVELY OUTPUT ONE OF A PLURALITY OF INPUT POWERS

CROSS-REFERENCE TO RELATED APPLICATIONS

This application claims all benefits accruing under 35 U.S.C. §119 from Korean Patent Application No. 2006-84872, filed on Sep. 4, 2006, in the Korean Intellectual Property Office the disclosure of which is incorporated herein by reference.

BACKGROUND OF THE INVENTION

1. Field of the Invention

The present invention relates to a power supply apparatus, and more particularly, to a power supply apparatus capable of selecting and supplying power from one of a plurality of inputs.

2. Related Art

An electric apparatus, such as a mobile printer, a notebook personal computer (PC) or other mobile device, may include a power supply apparatus comprising an adapter to convert an external power and a battery provided inside thereof, and a device to properly select or control between the power provided from the adapter (hereinafter, referred to as "adapter power") and the power provided from the battery (hereinafter, referred to as "battery power") based on a current state of the electric apparatus.

Figure 1:
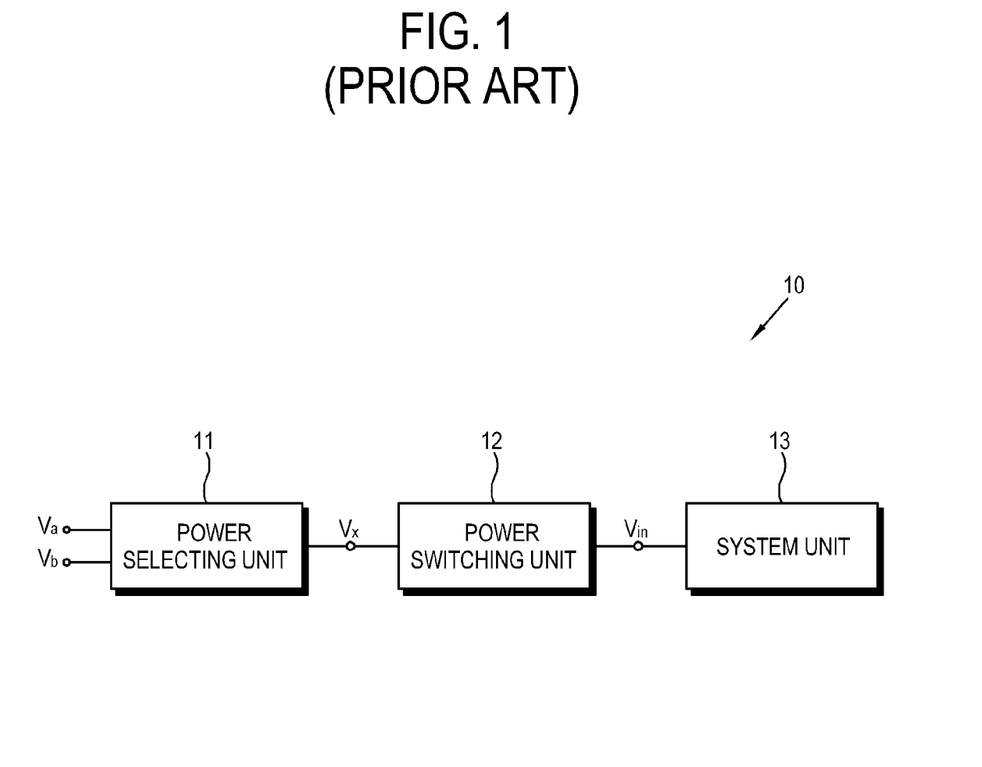
FIG. 1 is a block diagram illustrating an electric apparatus having a typical power supply apparatus.

FIG. 1 illustrates a typical electric apparatus. As shown in FIG. 1, such an electric apparatus 10 comprises a power selecting unit 11, a power switching unit 12 and a system unit 13. The system unit 13 comprises actual components of every configuration, except for a configuration connected to power, for example, a printing engine (not shown), a user interface (not shown) and so on. The power selecting unit 11 selects between the adapter power Va and the battery power Vb according to the condition, and supplies the selected power to the power switching unit 12. The power switching unit 12 then transmits the selected power Vx from the power selecting unit 11 to the system unit 13 according to a system power on/off signal (hereinafter, referred to as "power switching signal") which is inputted by a user. Herein, the power selecting unit 11 and the power switching unit 12 can be referred to as a power supplying apparatus.

In the conventional power supplying apparatus, the power switching unit 12 is provided at an output terminal of the power selecting unit 11 to directly control a system power Vin which is the main power. In addition, multiple high-cost field-effect transistors (FETs) and a separated control device are required for a high-power application. As a result, the conventional power supplying apparatus can be large and expensive.

Specifically, FETs are incorporated into the power selecting unit 11 as well as the power switching unit 12. In the situation where the power selecting unit 11 and the power switching unit 12 are combined, a plurality of FETs are connected in series so that a value of voltage can be dropped by each circuit element. Therefore, a voltage value of the system power Vin (hereinafter, referred to as "input voltage level") may not be in the range which is needed in the system unit 13 because of the voltage drop. However, if the FETs having a low resistance value are used for a high-power application to ensure that the input voltage level is at a level needed in the system unit 13, the production cost can be very high. Furthermore, if the input voltage level is at the level needed in the system unit 13, the range of usable voltage in the battery power Vb (for example, generally it is between 3V and 4.2V) becomes more narrow such that the battery power Vb cannot be sufficiently used. As a result, the life of the battery can be shortened.

SUMMARY OF THE INVENTION

Several aspects and example embodiments of the present invention provide a power supply apparatus which is capable of reducing a cost and a size thereof when selecting and supplying a selected power from of a plurality of power sources, and which makes a voltage drop by a circuit element minimal.

Additional aspects and/or advantages of the invention will be set forth in part in the description which follows and, in part, will be obvious from the description, or may be learned by practice of the invention.

In accordance with an example embodiment of the present invention, a power supplying apparatus for supplying power to a predetermined system unit is provided with a power selecting unit which is directly connected to the system part, to select one of a plurality of inputs of power and output a selected power to the system unit; and a controller which is provided outside a power supplying path between the power selecting unit and the system unit, to control the power selecting unit to selectively output the selected power to the system unit according to a power switching signal.

According to an aspect of the present invention, the plurality of inputs of power comprises an adapter power and a battery power.

According to an aspect of the present invention, the power selecting unit selects one which has a higher input voltage between the adapter power and the battery power.

According to another aspect of the present invention, the power selecting unit further comprises a first comparator and a second comparator which compare voltages of the adapter power and voltage of the battery power, respectively, and output signals having opposite logic states each other according to the comparing result, respectively; and a first switching part and a second switching part which selectively output the adapter power and the battery power according to the outputs of the first and the second comparators to the system part.

According to an aspect of the present invention, the outputs of the first and the second comparators are open-collector inputs, and the controller comprises at least one switching transistor selectively supplying a pull-up voltage to output terminals of the first and the second comparators according to the power switching signal.

According to an aspect of the present invention, the power selecting unit further comprises a division resistor dividing voltage of at least one of the adapter power and the battery power.

According to an aspect of the present invention, the first and the second switching parts respectively comprise an MOSFET.

According to an aspect of the present invention, the power selecting unit comprises a first transistor and a second transistor respectively operating the first switching part and the second switching part according to the outputs of the first comparator and the second comparator.

According to another aspect of the present invention, a first diode and a second diode are further provided to supply one of the adapter power and the battery power to the first comparator and the second comparator.

According to an aspect of the present invention, the power selecting unit further comprises a division resistor dividing voltage of at least one of the adapter power and the battery power.

According to another aspect of the present invention, the power selecting unit further comprises a first transistor and a second transistor respectively operating the first switching part and the second switching part according to the outputs of the first comparator and the second comparator.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to present embodiments of the present invention, examples of which are illustrated in the accompanying drawings, wherein like reference numerals refer to like elements throughout. The embodiments are described below in order to explain the present invention by referring to the figures.

Figure 2:
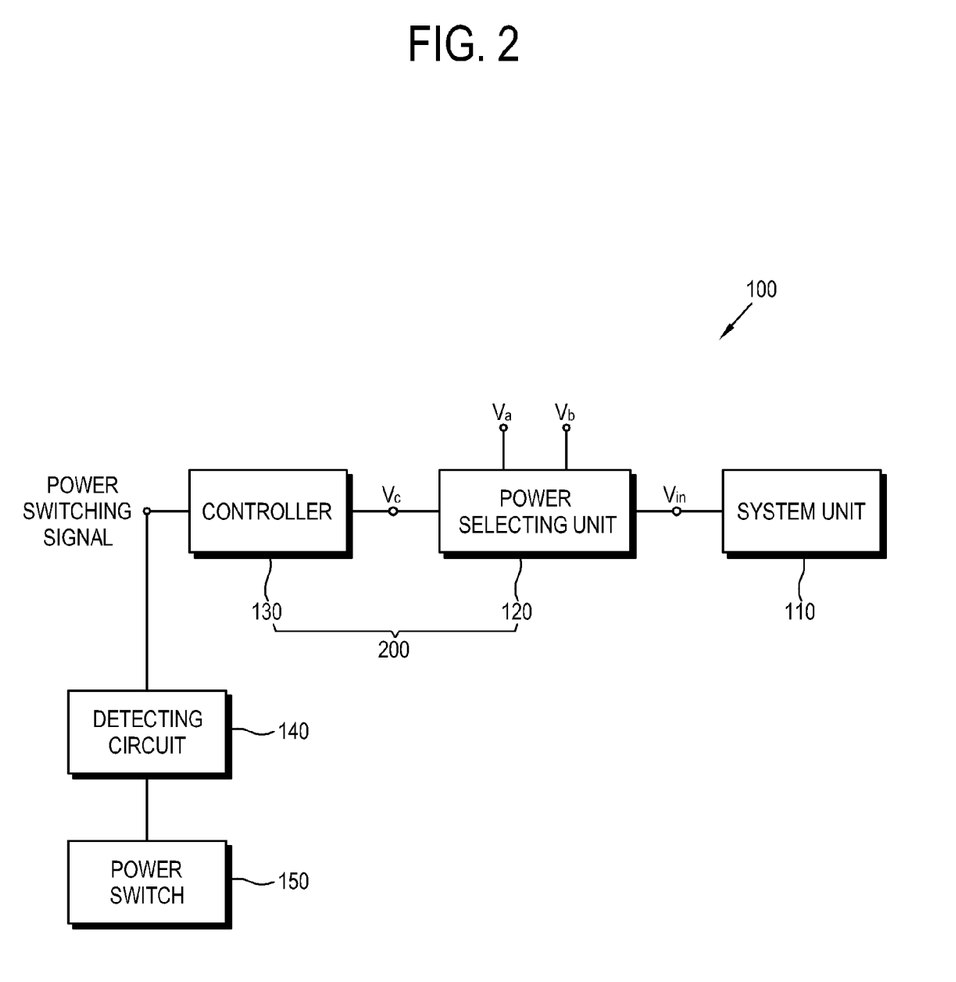
FIG. 2 is a block diagram illustrating an electrical apparatus having a power supply apparatus incorporated according to an example embodiment of the present invention.

FIG. 2 is a block diagram illustrating an electric apparatus 100 according to an embodiment of the present invention. Such an electric apparatus 100 can be a mobile printer, a notebook PC, and other portable devices. The electric apparatus 100 is also provided with an adapter (not shown) to convert power from an external power source, such as AC power, into DC power serving as usable system power, and a battery (not shown) provided inside to supply battery power.

As shown in FIG. 2, the electric apparatus 100 comprises a system unit 110 including on one or more system components arranged to receive an operating power and to perform a main operation, such as printing driven by such an operating power. The electric apparatus 100 further comprises a power supply apparatus 200 including a power selecting unit 120 and a controller 130 arranged to supply a system power Vin as an operating power to the system unit 110. The power supplying apparatus 200 can be provided inside of the electric apparatus 100 or can be detachably provided outside of the electric apparatus 100. The system unit 110 has an input voltage terminal provided with the system power Vin having the input voltage level, so as to operate one or more system components included therein. Herein, the input voltage level has a predetermined permissible range. As a result, if a voltage drop in the power selecting unit 120 is within the predetermined permissible range, the system unit 110 can be operated without any problem.

The power selecting unit 120 is directly connected to an input voltage terminal of the system unit 110 in order to supply the system power Vin to the system unit 110. The power selecting unit 120 selects between an adapter power Va and a battery power Vb, and outputs a selected power as the system power Vin. According to an example embodiment of the present invention, the power selecting unit 120 selects between the adapter power Va and the battery power Vb according to a condition; however, such a condition is not necessary. In addition, the voltage drop of the circuit element in the power selecting unit 120 should be minimized so that the voltage level of the system power Vin can be within a predetermined permissible range of the input voltage level.

The controller 130 controls the power selecting unit 120 to selectively supply the system power Vin to the system unit 110 according to an external power switching signal. The controller 130 is provided outside a power supply path of the system power Vin between the power selecting unit 120 and the system unit 110, to generate a control signal Vc and supply the control signal Vc to the power selecting unit 120. Herein, the control signal Vc is used to determine whether the system power Vin is supplied to the system unit 110. This way, the controller 130 does not switch the system power Vin ON/OFF directly such that simple circuitry can be utilized in place of high-power FETs for power switching operations. As a result, the cost and the size of the electric apparatus 100 can be advantageously reduced.

Figure 3:
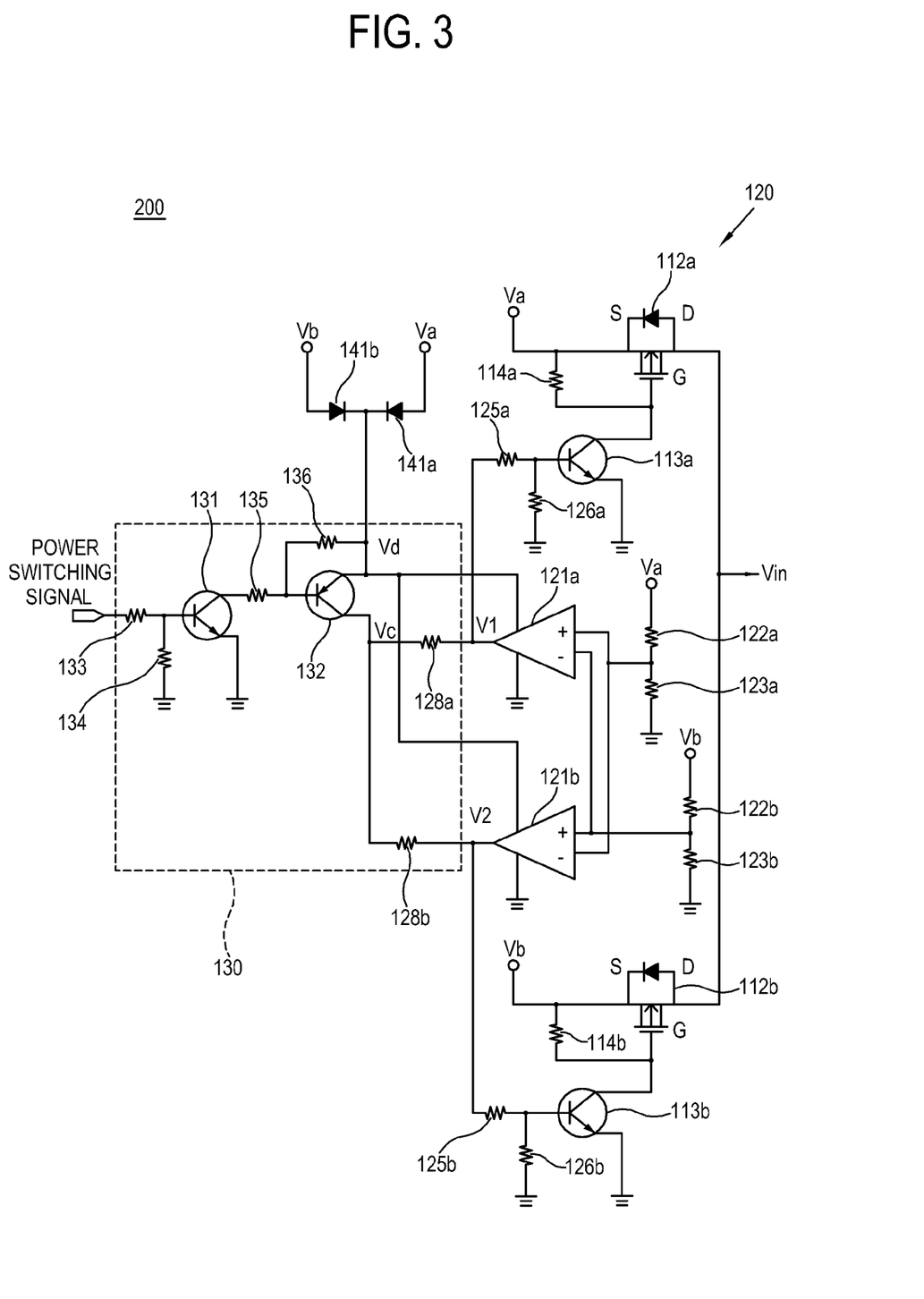
FIG. 3 is a circuit diagram illustrating a power supply apparatus according to an example embodiment of the present invention.

Turning now to FIG. 3, a detailed circuit diagram of a power supply apparatus according to an example embodiment of the present invention is illustrated. Referring to FIG. 3, the power selecting unit 120 outputs one, which has a higher voltage value between the adapter power Va and the battery power Vb, as the system power Vin. For example, if one of the adapter power Va and the battery power Vb is inputted to the power selecting unit 120, the power selecting unit 120 outputs an input power as the system power Vin. However, if both of the adapter power Va and the battery power Vb are inputted to the power selecting unit 120, the power selecting unit 120 outputs one, which has a higher voltage value between the adapter power Va and the battery power Vb, as the system power Vin. For example, if a voltage value of the adapter power Va is 5 volts (5V), and a voltage value of the battery power Vb is 4.2 volts (4.2V), and if both of the adapter power Va and the battery power Vb are inputted to the power selecting unit 120, the adapter power Va of 5 volts is selected for output. Accordingly, power consumption of the battery is minimized.

As shown in FIG. 3, the power selecting unit 120 comprises a first switching part 112a, a second switching part 112b, a first comparator 121a and a second comparator 121b. If the adapter power Va is inputted to the first switching part 112a, the first switching part 112a selectively outputs the adapter power Va as the system power Vin according to an output of the first comparator 121a. However, if the battery power Vb is inputted to the second switching part 112b, the second switching part 112b selectively outputs the battery power Vb as the system power Vin according to an output of the second comparator 121b.

The first switching part 112a and the second switching part 112b respectively comprise metal-oxide-semiconductor field-effect transistors (MOSFETs). Generally, the voltage drop of the MOSFET is characteristically very little though the value of current of the MOSFET is high, when the MOSFET is turned ON so that the voltage drop of the first switching part 112a and the second switching part 112b is within a predetermined permissible range of the input voltage level of the system unit 110. Accordingly, the voltage drop of the adapter power Va and the battery power Vb can be advantageously minimized. According to an example embodiment of the present invention, the first switching part 112a and the second switching part 112b are P-type MOSFETs. The first switching part 112a and the second switching part 112b respectively comprise sources (S) through which the adapter power Va or the battery power Vb is inputted and drains (D) which are output terminals of the system power Vin.

The first and the second comparators 121a and 121b respectively output a first voltage signal V1 showing which has a higher voltage level between the adapter power Va and the battery power Vb, and a second voltage signal V2 having an opposite logic state to the first voltage signal V1. The circuits of the first and the second comparators 121a and 121b are respectively simple, and power consumption can be minimized because these simple circuits consume little power.

The first comparator 121a outputs the first voltage signal V1 whose logic state is "high" if the voltage value of the adapter power Va is higher than the voltage value of the battery power Vb, and whose logic state is "low" if the voltage value of the adapter power Va is lower than the voltage value of the battery power Vb. Likewise, the second comparator 121b outputs the second voltage signal V2 whose logic state is "high" if the voltage value of the battery power Vb is higher than the voltage value of the adapter power Va, and whose logic state is "low" if the voltage value of the battery power Vb is lower than the voltage value of the adapter power Va. In any case, the logic state of the first voltage signal V1 and the second voltage signal V2 are always opposite.

The outputs of the first comparator 121a and the second comparator 121b are preferably open-collector outputs. In other words, the first comparator 121a and the second comparator 121b output the first voltage signal V1 and the second voltage signal V2 only when a predetermined pull-up voltage is input to an output terminals (referring to V1 and V2) thereof. If the pull-up voltage is not input to the first comparator 121a and the second comparator 121b, the first comparator 121a and the second comparator 121b do not output signals. The pull-up voltage may be input as a control signal Vc by the controller 130.

The power selecting unit 120 may further comprise first division resistors 122a and 123a and second division resistors 122b and 123b which divide the voltage of the adapter power Va and the battery power Vb, and output the divided voltage to the first comparator 121a and the second comparator 121b. The value of the first division resistors 122a and 123a and the value of the second division resistors 122b and 123b may be equal. According to another embodiment of the present invention, the value of the first division resistors 122a and 123a and the value of the second division resistors 122b and 123b can be properly set so that the differences of the voltages across the first division resistors 122a and 123a and the second division resistors 122b and 123b, respectively become large. Accordingly, the battery power Vb can be prevented from being selected unintentionally because the battery power Vb gets higher than the adapter power Va according to an error. Specifically, the value of the first division resistor 123a is large or the value of the second division resistor 123b is small. However, the values of these division resistors are not limited thereto.

The first comparator 121a and the second comparator 121b receive an operating power Vd which is supplied through a first diode 141a and a second diode 141b. The first diode 141a and the second diode 141b have anodes which are respectively connected to the adapter power Va and the battery power Vb. The cathodes of the first diode 141a and the second diode 141b are connected to each other and the operating power Vd is outputted from the cathodes thereof. In other words, the input one of the adapter power Va and the battery power Vb is outputted as the operating power Vd. Because a voltage drop occurs in the first diode 141a and the second diode 141b, the first comparator 121a and the second comparator 121b preferably have an input voltage level range which is capable of sufficiently compensating for the voltage drop. For example, a predetermined permissible range of the input voltage level of the first comparator 121a and the second comparator 121b may be between 2 volts (2V) and 18 volts (18V).

The power selecting unit 120 may further comprise a first transistor 113a and a second transistor 113b which operate the first switching part 112a and the second switching part 112b according to the output of the first comparator 121a and the second comparator 121b. The first transistor 113a and the second transistor 113b are preferred to respectively comprise bipolar transistors of NPN types. Also, the power selecting unit 120 may further comprise third division resistors 125a and 126a and fourth division resistors 125b and 126b which properly divide the voltage of the first controlling signal V1 and the second controlling signal V2 for a base current of the first transistor 113a and the second transistor 113b.

Furthermore, the power selecting unit 120 may comprise protecting resistors 114a and 114b which respectively connect the respective sources (S) of the first and the second switching parts 112a and 112b to the respective gates (G) thereof so as to prevent the first and the second switching parts 112a and 112b from making an error due to noise.

The power selecting unit 120 operates as follows. First of all, at least one of the adapter (or external power) and the battery is first connected to the power selecting unit 120, the operating power Vd is supplied to the first comparator 121a and the second comparator 121b, and the first comparator 121a and the second comparator 121b start to operate. If the adapter power Va is input and the battery power Vb is not input thereto, the voltage value of the adapter power Va is higher than the voltage value of the battery power Vb. Accordingly, if the pull-up voltage (referring to Vc) is supplied, the first comparator 121a outputs the first voltage signal V1 having a "high" logic state, and the second comparator 121b outputs the second voltage signal V2 having a "low" logic state which is opposite to the first comparator 121a.

According to the first voltage signal V1 having the "high" logic state, the first transistor 113a is turned ON and the gate (G) of the first switching part 112a is grounded. The voltage difference between the gate (G) and the source (S) of the first switching part 112a satisfies a turn ON condition of the MOSFET (for example, the voltage difference between the gate (G) and the source (S) is larger than 3V so that the first switching part 112a is turned ON. In this case, the system power Vin has an almost equal voltage value to the adapter power Va.

If the second voltage signal V2 has a "low" logic state, the second transistor 113b is turned OFF. In this case, the voltage difference between the gate (G) and the source (S) of the second switching part 112b do not satisfy the turn ON condition of the MOSFET so that the second switching part 112b is turned OFF.

If the adapter power Va is not input and the battery power Vb is input thereto, the system power Vin has an almost equal value to the battery power Vb. If both of the adapter power Va and the battery power Vb are input thereto, the adapter power Va is higher than the battery power Vb so that the system power Vin has an almost equal voltage value to the adapter power Va.

Meanwhile, referring back to FIG. 3, the controller 130 is provided with a first switching transistor 131 and a second switching transistor 132 which selectively supply the pull-up voltage (referring to Vc) to the output terminals (referring to V1 and V2) of the first comparator 121a and the second comparator 121b according to a power switching signal input from the outside. In addition, the controller 130 is further provided with first to fourth resistors 133 to 136, a first pull-up resistor 128a, and a second pull-up resistor 128b.

The first switching transistor 131 is preferably an NPN-type bipolar transistor, and the second switching transistor 132 is preferably a PNP-type bipolar transistor. The power switching signal is input to a base of the first switching transistor 131 through the first resistor 133, and an emitter of the first switching transistor 131 is grounded. One terminal of the second resistor 134 is connected to the base of the first switching transistor 131 and the other terminal of the second resistor 134 is grounded. The collector of the first switching transistor 131 is connected to a base of the second switching transistor 132 through the third resistor 135. An emitter of the second switching transistor 132 is connected to the cathodes of the first diode 141a and the second diode 141b, and a collector of the second switching transistor 132 is connected to one terminal of the first pull-up resistor 128a and one terminal of the second pull-up resistor 128b. One terminal of the fourth resistor 136 is connected to the base of the second switching transistor 132 and the other terminal thereof is connected to the emitter of the second switching transistor 132. The other terminals of the first pull-up resistor 128a and the second pull-up resistor 128b are respectively connected to the output terminals (referring to V1 and V2) of the first comparator 121a and the second comparator 121b.

The controller 130 operates as follows. Referring to FIGS. 2 and 3, the electric apparatus 100 preferably comprises a power switch 150 which a user uses to turn power ON and OFF, and a detecting circuit 140 to generate a power switching signal after detecting the state of the power switch 150. First of all, when the power switch 150 is turned OFF by a user, the power switching signal having a "low" logic state is input to the controller 130 so that the first switching transistor 131 and the second switching transistor 132 are turned OFF. Accordingly, the control signal Vc becomes low and the pull-up voltage is not input to the first comparator 121a and the second comparator 121b. Therefore, the first comparator 121a and the second comparator 121b are not able to output signals. Consequently, the system power Vin is not supplied to the system unit 110 even if at least one of the adapter power Va and the battery power Vb is input.

If the power switch 150 is turned ON by a user, the controller 130 receives the power switching signal having a "high" logic state. In this case, if at least one of the adapter power Va and the battery power Vb is input, the first switching transistor 131 and the second switching transistor 132 are turned ON. Accordingly, the control signal Vc becomes high and the pull-up voltage are input to the first comparator 121a and the second comparator 121b. Therefore, the first comparator 121a and the second comparator 121b output signals and one of the input adapter power Va and battery power Vb is supplied to the system unit 110 as the system power Vin.

As described above, the present invention provides a power supply apparatus which can be cost-effective (i.e., lower production cost), smaller in size, and effective for enabling a user to select and output a selected one of a plurality of power sources. In other words, when the power supply apparatus selects and outputs one among the power, the controlling circuit does not directly switch the system power Vin, and switches output of the power selecting unit 120. Therefore, the power supply apparatus 200 is capable of reducing the cost and size thereof. Furthermore, because the controller is provided outside a power supplying path of the system power Vin, the voltage drop and power consumption of circuit elements can be minimized, and the life of the battery can be extended as usable voltage when sufficiently used.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the controller 130 and the power selecting unit 120, as shown in FIG. 3, can be constructed using different circuit elements, including simple transistors, diodes and resistors. Accordingly, it is intended, therefore, that the present invention not be limited to the various example embodiments disclosed, but that the present invention includes all embodiments falling within the scope of the appended claims.

What is claimed is:

1. A power supplying apparatus to supply power to a system unit comprising one or more system components, the power supplying apparatus comprising:

a power selecting unit connected directly to the system unit to select one of a plurality of inputs of power and output a selected power to the system unit; and a controller provided outside a power supply path between the power selecting unit and the system unit to control the power selecting unit to selectively output the power selected by the power selecting unit to the system unit according to a power switching signal received from an external source, wherein the power selecting unit comprises a plurality of switching control units each comprising an output to output a switching control signal, a plurality of power switching units each comprising a control input to receive the switching control signal from a corresponding one of the switching control units, a power input to receive a corresponding one of the inputs of power, and a power output to output the corresponding one of the inputs of power directly to the system unit according to the switching control signal received from the corresponding one of the switching control units, the controller generates an output control signal according to the power switching signal, and outputs the output control signal to the output of each of the switching control units to control each of the switching control units to selectively output the switching control signal according to the output control signal, and the controller comprises a first switching transistor having a base coupled to receive the power switching signal, via a first resistor, and an emitter connected to ground, and a second switching transistor having a base connected to a collector of the first switching transistor, via a second resistor, an emitter connected to cathodes of a first diode and a second diode arranged to supply one of the plurality of inputs to a first comparator and a second comparator, and a collector connected to outputs of the first comparator and the second comparator from which the switching control signals are outputted, via a first pull-up resistor and a second pull-up resistor, respectively, to supply the output control signal to the outputs of the first comparator and the second comparator from which the switching control signals are outputted.

2. The power supplying apparatus according to claim 1, wherein the plurality of inputs of power comprise an adapter power and a battery power.

3. The power supplying apparatus according to claim 2, wherein the power selecting unit selects whichever one of the adapter power and the battery power has a higher input voltage.

4. The power supplying apparatus according to claim 3, wherein the first comparator and the second comparator each compare voltages of the adapter power and the battery power with each other, and output respective switching control signals having opposite logic states with respect to each other according to the result of the comparing, and the power switching units comprise a first switching part and a second switching part that selectively output the adapter power and the battery power to the system unit according to the switching control signals outputted from the first comparator and the second comparator.

5. The power supplying apparatus according to claim 4, wherein outputs of the first comparator and the second comparator from which the switching control signals are outputted are open-collector outputs.

6. The power supplying apparatus according to claim 5, wherein the power selecting unit further comprises a division resistor to divide a voltage of at least one of the adapter power and the battery power.

7. The power supplying apparatus according to claim 5, wherein the power selecting unit further comprises a first transistor and a second transistor respectively operating the first switching part and the second switching part according to the switching control signals outputted from the first comparator and the second comparator.

8. The power supplying apparatus according to claim 4, wherein the power selecting unit further comprises a division resistor to divide a voltage of at least one of the adapter power and the battery power.

9. The power supplying apparatus according to claim 4, wherein each of the first switching part and the second switching part comprises a MOSFET.

10. The power supplying apparatus according to claim 4, wherein the power selecting unit further comprises a first transistor and a second transistor to respectively operate the first switching part and the second switching part according to the switching control signals outputted from the first comparator and the second comparator.

11. The power supplying apparatus according to claim 1, wherein the power switching signal is generated by a power switch that is operable between an ON position and an OFF position by a user of the power supplying apparatus.

12. The power supplying apparatus according to claim 1, further comprising:
an operating power input to receive an operating power to operate the power selecting unit and the controller; and
a power switching signal input, separate from the operating power input, to receive the power switching signal.

13. An electronic apparatus, comprising:
a main unit comprising one or more main components;
a power selecting unit connected directly to the main unit, to select one of an adapter power and a battery power and to supply a selected power to the main unit to drive operation of the one or more main components; and
a controller arranged to control the power selecting unit to select and supply the selected power to the main unit according to a power switching signal received from an external source;
wherein the power selecting unit comprises a plurality of switching control units each comprising an output to output a switching control signal, and a plurality of power switching units each comprising a control input to receive the switching control signal from a corresponding one of the switching control units, a power input to receive a corresponding one of the adapter power and the battery power, and a power output to output the corresponding one of the adapter power and the battery power directly to the system unit according to the switching control signal received from the corresponding one of the switching control units,
the controller generates an output control signal according to the power switching signal, and outputs the output control signal to the output of each of the switching control units to control each of the switching control units to selectively output the switching control signal according to the output control signal,
the switching control units comprise a first comparator and a second comparator arranged in parallel that each compare voltages of the adapter power and the battery power with each other, and output respective switching control signals having opposite logic states with respect to each other according to a result of the comparing, and
the power switching units comprise a first switching part and a second switching part arranged in parallel that selectively supply the adapter power and the battery power to the main unit according to the switching control signals outputted from the first comparator and the second comparator, and
the controller comprises
a first switching transistor having a base coupled to receive the power switching signal, via a first resistor, and an emitter connected to ground; and
a second switching transistor having a base connected to a collector of the first switching transistor, via a second resistor, an emitter connected to cathodes of a first diode and a second diode arranged to supply one of the adapter power and the battery power to the first comparator and the second comparator, and a collector connected to outputs of the first comparator and the second comparator from which the switching control signals are outputted, via a first pull-up resistor and a second pull-up resistor, respectively, to supply the output control signal to the outputs of the first comparator and the second comparator from which the switching control signals are outputted.

14. The electronic apparatus according to claim 13, wherein the power switching signal is generated by a power switch that is operable between an ON position and an OFF position by a user of the electronic apparatus.

15. The electronic apparatus according to claim 13, wherein the power selecting unit selects whichever one of the adapter power and the battery power has a higher input voltage.

16. The electronic apparatus according to claim 13, wherein the controller comprises at least one switching transistor to selectively supply a pull-up voltage as the output control signal to outputs of the first comparator and the second comparator from which the switching control signals are outputted according to the power switching signal.

17. The electronic apparatus according to claim 13, wherein the power selecting unit further comprises:
- a division resistor to divide a voltage of at least one of the adapter power and the battery power; and
- a first transistor and a second transistor arranged in parallel to respectively operate the first switching part and the second switching part according to the switching control signals outputted from the first comparator and the second comparator.

18. The electronic apparatus according to claim 13, wherein each of the first switching part and the second switching part comprises a MOSFET.

19. The electronic apparatus according to claim 13, wherein the first switching transistor is an NPN-type bipolar transistor and the second switching transistor is a PNP-type bipolar transistor.

20. The electronic apparatus according to claim 13, further comprising:
- an operating power input to receive an operating power to operate the power selecting unit and the controller; and
- a power switching signal input, separate from the operating power input, to receive the power switching signal.

* * * * *